United States Patent
Schneider et al.

(10) Patent No.: US 12,334,527 B2
(45) Date of Patent: Jun. 17, 2025

(54) USE OF A COMPOSITE MATERIAL FOR ABSORBING AND DISTRIBUTING LIQUIDS IN ACTIVELY AND/OR PASSIVELY COOLED CURRENT-CARRYING SYSTEMS

(71) Applicant: Carl Freudenberg KG, Weinheim (DE)

(72) Inventors: Ulrich Schneider, Darmstadt (DE); Sarah Senne, Heddesheim (DE); Peter Kritzer, Forst (DE)

(73) Assignee: CARL FREUDENBERG KG, Weinheim (DE)

( * ) Notice: Subject to any disclaimer, the term of this patent is extended or adjusted under 35 U.S.C. 154(b) by 609 days.

(21) Appl. No.: 17/767,060

(22) PCT Filed: Oct. 8, 2020

(86) PCT No.: PCT/EP2020/078201
§ 371 (c)(1),
(2) Date: Apr. 7, 2022

(87) PCT Pub. No.: WO2021/069539
PCT Pub. Date: Apr. 15, 2021

(65) Prior Publication Data
US 2022/0367935 A1    Nov. 17, 2022

(30) Foreign Application Priority Data
Oct. 9, 2019    (DE) ............. 10 2019 127 180.0

(51) Int. Cl.
*H01M 10/655*    (2014.01)
*H01M 10/613*    (2014.01)
*H01M 10/6567*    (2014.01)

(52) U.S. Cl.
CPC ....... *H01M 10/655* (2015.04); *H01M 10/613* (2015.04); *H01M 10/6567* (2015.04)

(58) Field of Classification Search
CPC ............. H01M 10/655; H01M 10/613; H01M 10/6567; H01M 4/62; H01M 10/60
See application file for complete search history.

(56) References Cited

U.S. PATENT DOCUMENTS

| 4,007,641 A | 2/1977 | Kelsey |
| 4,453,424 A | 6/1984 | Hackett |

(Continued)

FOREIGN PATENT DOCUMENTS

| DE | 102006031418 A1 | 1/2007 |
| DE | 102010022327 A1 | 12/2011 |

(Continued)

OTHER PUBLICATIONS

English JP-2012094376A (Year: 2012).*

(Continued)

*Primary Examiner* — Nicholas A Smith
*Assistant Examiner* — Seamus Patrick McNulty
(74) *Attorney, Agent, or Firm* — LEYDIG, VOIT & MAYER, LTD.

(57) ABSTRACT

The invention relates to the use of a composite material, comprising a backing layer and a liquid-absorbing layer fixed on the backing layer, the liquid-absorbing layer containing fixed superabsorbent particles, there being, on the side of the liquid-absorbing layer facing away from the backing layer, a liquid-distributing layer which is in liquid-conducting contact with the liquid-absorbing layer and absorbs and distributes, in the plane of the composite material, a liquid to be absorbed, for absorbing and distributing liquids in actively- and/or passively-cooled current-carrying systems—in particular, in actively- and/or passively-cooled energy storage systems.

19 Claims, 4 Drawing Sheets

(56) References Cited

U.S. PATENT DOCUMENTS

| | | |
|---|---|---|
| 4,499,777 A | 2/1985 | Hackett |
| 4,842,594 A * | 6/1989 | Ness ................ A61F 13/53743 |
| | | 604/378 |
| 9,543,549 B2 * | 1/2017 | Bai ....................... H10K 50/846 |
| 2007/0142803 A1 * | 6/2007 | Soerens .................. A61L 15/60 |
| | | 604/368 |
| 2009/0187155 A1 * | 7/2009 | Razavi .................... A61L 15/46 |
| | | 604/378 |
| 2011/0290554 A1 | 12/2011 | Bogner |
| 2011/0318628 A1 * | 12/2011 | Heim ............... H01M 10/6568 |
| | | 429/120 |
| 2013/0280564 A1 | 10/2013 | Zheng et al. |
| 2014/0134469 A1 | 5/2014 | Dämon |
| 2014/0318276 A1 | 10/2014 | Cappa et al. |

FOREIGN PATENT DOCUMENTS

| | | | | |
|---|---|---|---|---|
| DE | 102017004296 A1 | | 11/2017 | |
| EP | 2731164 A1 | | 5/2014 | |
| EP | 2926839 B1 | * | 6/2019 | ............ A61K 33/00 |
| GB | 1456353 A | | 11/1976 | |
| JP | S 5835461 A | | 3/1983 | |
| JP | H 1076589 A | | 3/1998 | |
| JP | 2002224161 A | | 8/2002 | |
| JP | 2003300296 A | * | 10/2003 | ............ H01G 11/36 |
| JP | 3170131 U | | 12/2011 | |
| JP | 2012094376 A | * | 5/2012 | |
| JP | 2014509436 A | | 10/2013 | |

OTHER PUBLICATIONS

Kalin and Polajnar, The wetting of steel, DLC coatings, ceramics and polymers with oils and water: The importance and correlations of surface energy, surface tension, contact angle and spreading, 2014, Applied Surface Science, vol. 293, 28, p. 97-108 (Year: 2014).*
English translation of JP2003300296A (Year: 2003).*
English Translation of EP-2926839-B1 (Year: 2019).*

* cited by examiner

USE OF A COMPOSITE MATERIAL FOR ABSORBING AND DISTRIBUTING LIQUIDS IN ACTIVELY AND/OR PASSIVELY COOLED CURRENT-CARRYING SYSTEMS

CROSS-REFERENCE TO PRIOR APPLICATIONS

This application is a U.S. National Phase application under 35 U.S.C. § 371 of International Application No. PCT/EP2020/078201, filed on Oct. 8, 2020, and claims benefit to German Patent Application No. DE 10 2019 127 180.0, filed on Oct. 9, 2019. The International Application was published in German on Apr. 15, 2021 as WO 2021/069539 under PCT Article 21(2).

FIELD

The invention relates to the use of a composite material for absorbing and distributing liquids in actively- and/or passively-cooled current-carrying systems—in particular, in actively- and/or passively-cooled energy storage systems. The invention further relates to an absorber pad and an actively- and/or passively-cooled current-carrying system which contain the composite material.

BACKGROUND

Current-carrying systems—in particular, battery systems—are becoming increasingly more important, since they are required for driving electric and hybrid vehicles. A "current-carrying system" is known to be a system through which electric current flows. Relevant current-carrying systems in practice are "energy storage systems," i.e., systems for storing currently available, but not required, energy for later use. This storage is frequently accompanied by a conversion of the energy form—for example, from electrical energy into chemical energy. As needed, the energy is then converted back into the desired electrical form. As is known, battery systems are modules which are connected in series or in parallel and contain secondary or primary cells connected in series or in parallel. Further current-storing systems are accumulators, i.e., modules which are connected in series or in parallel and contain secondary cells connected in series or in parallel. Likewise relevant current-storing systems in practice are capacitors, i.e., passive electrical components with the ability to store electrical charge and the associated energy statically in an electric field in a DC circuit.

In order to ensure optimal functioning of the systems, it is necessary to keep the temperature of the battery cells within a desired temperature range. In order to prevent the operating temperature from being exceeded and/or undershot, active or passive temperature control systems are used. The use of a liquid temperature control medium having a high heat capacity, which medium is guided in a highly thermally-conductive manner in a heat exchanger along the battery cells, has proven particularly effective.

In addition, the systems are generally not hermetically sealed with respect to the environment. This means that they allow gas exchange with the environment. In order to prevent contamination penetration, the incoming air is filtered. For this purpose, microporous foils or non-wovens are used, for example.

All of these approaches allow filtering of particles, but not of gases and, in particular, also not of water vapor. Water vapor can thus pass through the films into the electronic housing. However, since the interior of the housing is cooled, water can condense at cold points in the housing (if its dew point is exceeded). Since, in particular, current-carrying parts are cooled, the formation of condensate takes place where it is most critical.

If, in addition, the temperature in the housing itself is always at a low level, the condensate formed can be removed again from the housing only with difficulty. For example, pumps, controlled valves, or heating would be conceivable here. These approaches are complex, and possibly prone to errors. In addition, heating is prohibited in many applications (e.g., battery systems).

Appropriate means for water absorption are desiccants, which are attached in or in front of the housing and irreversibly bind the water. However, it is disadvantageous here that such means absorb not only liquid water, but also water vapor. If the means are situated in a housing, they also dehumidify the gas space in the housing. This has the consequence that water vapor, which would not enter the housing at all under normal circumstances, is thus also drawn into the housing. Such desiccant cartridges thus function not only as moisture absorbers, but also as a moisture suction device.

Another problem is that, e.g., in the case of an accident of a vehicle equipped in this way, leakages and thus escape of the temperature control medium from the heat sink can occur. The temperature control medium can then come into direct contact with the battery cells and, by virtue of its conductivity, can trigger a short circuit, for example.

A common desiccant is $P_2O_5$. Although it has an extremely high absorption capacity with respect to water, it forms liquid phosphoric acid when water is absorbed. This can lead to corrosion and, due to its electrical conductivity, represents a risk for electrical applications. In addition, the water absorption is irreversible. Other typical desiccants like $CaCl_2$ react in a similar way.

For this reason, the aforementioned desiccants are technically not expedient. Usually, the desiccants are loosely welded into bags (desiccant bags) and are thus not reliably fixed.

Further known liquid- and, in particular, water-absorbing substances are, for example, superabsorbents. Advantages of superabsorbents are that, on the one hand, they have a very high water absorption capacity, react chemically neutrally (also with respect to organic solvents), and can, moreover, be reversibly loaded.

With polar liquid media, superabsorbents result in strong swelling and, possibly, in gel formation. The swelling can, in particular, cause transport channels of the liquid to be blocked by the swelling process (so-called blocking effect) and subsequent absorption to no longer be possible. In addition, swelling in electronic devices is disadvantageous or harmful from two further points of view: On the one hand, the swollen material can build up mechanical pressures, by which electrical contacts can be separated, for example. On the other hand, in the event of uncontrolled swelling, the swollen material can cause electrical short circuits when it comes into contact with current-carrying parts.

If the superabsorbents are present in loose form, potential dust formation in the dry state is problematic, on the one hand, and, on the other, the removal in the swollen state is also not simple, since swollen superabsorbent particles are mechanically not stable. This leads to problems in the event of repair and/or maintenance.

Superabsorbent materials are known, for example, from medical products and are described, for example, in DE102006031418A1.

EP2731164 (A1) describes a battery system comprising battery cells, at least one absorption element, and a temperature control system with a liquid temperature control medium for cooling and/or heating the battery cells in a battery housing. The absorption element for absorbing the liquid temperature control medium is arranged between the battery cells and the battery housing, wherein the absorption element is a non-woven, wherein the non-woven has an average mass per unit area of 250 to 700 $g/m^2$ and comprises fibers of at least two different fiber types, wherein at least one of the fiber types is a reinforcing fiber and at least one other of the fiber types is an absorption fiber.

A disadvantage of the use of absorption fibers is that they generally have a lower absorption capacity than comparable absorbent particles. In addition, they generally have a lower thermal stability in the dry and in the swollen state. In addition, the use of absorbent fibers, as explained above, can result in a gel-blocking effect.

SUMMARY

In an embodiment, the present invention provides a method, comprising: providing a composite material, the composite material comprising: a backing layer; a liquid-absorbing layer fixed on the backing layer, the liquid-absorbing layer containing fixed superabsorbent particles; and a liquid-distributing layer in liquid-conducting contact with the liquid-absorbing layer is arranged on a side, facing away from the backing layer, of the liquid-absorbing layer, the liquid-distributing layer being configured to absorb and distribute, in a plane of the composite material, a liquid to be absorbed; and using the composite material to absorb and distribute liquids in actively- and/or passively-cooled current-carrying systems, the actively- and/or passively-cooled current-carrying systems comprising actively- and/or passively-cooled energy storage systems.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides at least partially eliminates the aforementioned disadvantages. In particular, a material is to be provided which has good water absorption and retention. The material should furthermore be able to reversibly bind water and, optionally, water vapor. In addition, it is to have controlled swellability, and a blocking effect should be avoidable. Finally, it should be possible to use it with minimal dust.

In an embodiment, the present invention provides a composite material, comprising a backing layer and a liquid-absorbing layer fixed on the backing layer, wherein the liquid-absorbing layer contains fixed superabsorbent particles, wherein a liquid-distributing layer in liquid-conducting contact with the liquid-absorbing layer is arranged on the side, facing away from the backing layer, of the liquid-absorbing layer and absorbs and distributes, in the plane of the composite material, a liquid to be absorbed, for the absorption and distribution of liquids in actively- and/or passively-cooled current-carrying systems—in particular, in actively- and/or passively-cooled energy storage systems.

According to the invention, it has been found that the above-described composite material is outstandingly suitable for absorbing and distributing liquids in actively- and/or passively-cooled current-carrying systems, since the risk of dust formation is significantly reduced by the fixation of the superabsorbent particles. The superabsorbent particles are preferably fixed to the backing layer—for example, by means of binders. This is advantageous in particular in the case of a mechanical load, as occurs, for example, when using the composite material in an automobile. In addition, the fixation makes it possible to use superabsorbents in particle form. In comparison to superabsorbent fibers, the latter have the advantage that they have a higher absorption capacity, with comparable thermal stability both in the dried and in the swollen state. In addition, it has surprisingly been found that fixed superabsorbent particles enable faster water-vapor absorption combined with a more complete discharge of water vapor than loose superabsorbent particles. Moreover, the composite material exhibits a very low gel-blocking effect, since the liquid-distributing layer used absorbs and distributes, in the plane of the composite material, the liquid to be absorbed. As a result, the absorption capacity of the liquid-absorbing layer can be optimally utilized.

According to the invention, the composite material is suitable for a wide variety of actively- and/or passively-cooled current-carrying systems—for example, battery systems, inverter/power electronics systems, and/or charging stations. A wide variety of liquids can be absorbed—for example, water and/or other cooling media, such as water-glycol mixtures.

Current-carrying systems preferred according to the invention are current-carrying systems selected from an energy storage system, a current-carrying energy converter, a transformer, a power electronics system, a control electronics system—in particular, a processor-controlled system—a charging station, an inverter, a rectifier, an electrolyzer, and/or combinations thereof.

According to the invention, preferred energy storage systems are battery systems, capacitors, and/or accumulators. Battery systems are most particularly preferred.

Superabsorbents are characterized in that they can bind and absorb liquid outstandingly. According to the invention, a superabsorbent is understood to mean a polymer that is able to suck up or absorb a multiple of—up to 500 times—its own weight in liquids—preferably water—wherein it increases in volume.

In the swollen state, superabsorbents form hydrogels. Suitable superabsorbents are, in particular, crosslinked polymers that are polar. Polyacrylamide, polyvinylpyrrolidone, amylopectin, gelatin, and cellulose are particularly preferred. Most particularly preferred are copolymers of acrylic acid (propenoic acid, $H_2C=CH-COOH$) and/or sodium acrylate (sodium salt of acrylic acid, $H_2C=CH-COONa$)

on the one hand and acrylamide on the other. The ratio of the two monomers to one another may vary.

Generally, a so-called core crosslinker (CXL) is added to the aforementioned monomers and, in places, connects (crosslinks) the formed long-chain polymer molecules to one another by chemical bridges. These bridges render the polymer non-water-soluble. Additionally, a so-called surface crosslinker (SXL) can be used. In this case, a further chemical is applied to the surface of the particles and, by heating, builds a second network only on the outer layer of the grain. This shell supports the swollen gel in order to hold it together even under external load (movement, pressure).

In a preferred embodiment of the invention, the superabsorbent particles are fixed on the backing layer with a binder—in particular, with a water-soluble binder, such as polyvinyl alcohol, starch, polyvinylpyrrolidone, casein glue, polyvinyl butyral, and/or with a water-swellable binder, such as at least partially-crosslinked polyvinyl alcohol and/or partially-crosslinked starch. A water-soluble binder is to be understood as a binder having a water solubility of at least 1 g/L, e.g., 1 g/L to 400 g/L, more preferably of 2 g/L to 350 g/L, and in particular of 5 g/L to 300 g/L, measured in each case at 23° C. An advantage of the use of water-soluble binders and/or water-swellable binders is that the free swellability of the superabsorbent is not restricted.

Preferably, the proportion of the water-soluble binder and/or water-swellable binder, relative to the total amount of binder, is at least 70 wt %, e.g., 70 wt % to 100 wt %, more preferably 80 wt % to 100 wt %, and, in particular, 90 wt % to 100 wt %.

In a further, preferred embodiment, the superabsorbent particles have a swelling retardant. This is advantageous in that the swelling of the superabsorbent particles can be delayed, whereby the distribution of the liquid to be absorbed is optimized, and the absorbing surface of the liquid-absorbing layer can be utilized particularly well. The swelling retardant can consist of the same materials as the water-soluble and/or swellable binders. Preferably, the superabsorbent particles are, at least partially, preferably completely encased by the swelling retardant.

The liquid-distributing layer absorbs a liquid to be absorbed and distributes it in the plane of the composite material.

In a further, preferred embodiment, the liquid-distributing layer comprises a non-woven, a woven fabric, a knitted fabric, an open-pore foam, and/or a binder—preferably a water-soluble and/or water-swellable binder. Preferred water-soluble binders are polyvinyl alcohol, starch, polyvinylpyrrolidone, casein glue, and polyvinyl butyral. Preferred water-swellable binders are, for example, at least partially-crosslinked polyvinyl alcohol and/or partially-crosslinked starch. An advantage of these materials is their good water permeability paired with high structural integrity even in the wet state. Preferred non-wovens are spun-bonded fabrics, wet-laid non-wovens, and/or dry-laid non-wovens. The weight per unit area is preferably 10 g/m² to 500 g/m².

In a further, preferred embodiment, the surface energy of the liquid-distributing layer, measured according to DIN 55660, is greater than 30 mN/m, preferably greater than 35 mN/m, and particularly preferably greater than 40 mN/m. This is advantageous in that polar media, such as water or water-glycol mixtures, can be distributed particularly well.

In a further, preferred embodiment, the liquid-distributing layer comprises at least two distribution layers, wherein at least one distribution layer is water-soluble, and at least one other distribution layer is not water-soluble. The water-soluble distribution layer may consist of the same materials as the water-soluble and/or swellable binder used for the superabsorbent particles. The non-water-soluble distribution layer preferably contains thermoplastic polymers—particularly with a melting point of below 260° C. Particularly preferred polymers are polyesters, copolyesters, polyamides, copolyamides, polyolefins, and/or blends thereof. These are advantageous in that they can be used for thermal welding.

In a further, preferred embodiment, the air permeability of the liquid-distributing layer is more than 10 dm³/(m²s)—preferably in the range of 20 to 3,000 dm³/(m²s), more preferably of 30 to 2,000 dm³/(m²s), and particularly preferably in the range of 30 to 1,000 dm³/(m²s). The air permeability is measured according to DIN EN ISO 9237 at a differential pressure of 100 Pa. The measurements of the air permeability are carried out before contact with liquid with samples of a thickness of 0.05 to 10 mm—preferably 3 mm—of a sample area of 20 cm² through which air flows, at an air pressure difference of 100 Pa.

In a preferred embodiment of the invention, the distribution layer—in particular, the non-water-soluble water distribution layer—has a mean pore size of more than 1 μm, e.g., of 1 μm to 1,000 μm, and preferably of 10 to 800 μm.

In a further, preferred embodiment of the invention, the distribution layer has microfibers—preferably with a titer of less than 1 dtex, e.g., of 0.01 to 1 dtex, and more preferably of 0.01 to 0.9 dtex. This is advantageous in that the microfibers enable a particularly high capillarity, and thus a particularly good distribution of liquids in the distribution layer.

In a further, preferred embodiment of the invention, the composite material has a liquid absorption quantity (VE water) of at least 2 L/m², e.g., 2 L/m² to 200 L/m², more preferably of 3 L/m² to 200 L/m², more preferably of 5 L/m² to 200 L/m², more preferably of 10 L/m² to 200 L/m², and, in particular, of 20 L/m² to 200 L/m².

The backing layer preferably contains thermoplastic polymers—particularly with a melting point of below 270° C. Particularly preferred polymers are polyesters, copolyesters, polyamides, copolyamides, polyolefin, and/or blends thereof. This is advantageous in that they can be used for thermal welding.

The backing layer preferably comprises a non-woven, a woven fabric, a knitted fabric, and/or an open-pore foam. Preferred non-wovens are spun-bonded fabrics, wet-laid non-wovens, and/or dry-laid non-wovens. The weight per unit area is preferably 10 g/m² to 500 g/m².

In a further, preferred embodiment, the composite material is compressible and can thereby easily be fixed in actively- and/or passively-cooled current-carrying systems—in particular, in actively- and/or passively-cooled energy storage systems. Moreover, good contact with adjacent components can thus be ensured.

In a further, preferred embodiment of the invention, the composite material has a non-water-soluble, liquid-distributing layer which contains thermoplastic polymers and a backing layer which likewise contains thermoplastic polymers. This is advantageous in that the non-water-soluble, liquid-distributing layer and the backing layer, welded to one another, can be used particularly well. Therefore, the backing layer and the liquid-distributing layer are preferably welded and/or weldable to one another. This is advantageous in that, when absorbing liquid, the liquid-absorbing layer can be restricted with regard to its extension in the height direction.

Surprisingly, it has been found that the composite material according to the invention has good sound absorption properties. In a further embodiment of the invention, the composite material thus has an absorption coefficient, measured according to EN ISO 354:2003, at a frequency of 6,300 Hz, of more than 0.09, more preferably of more than 0.2, and particularly preferably of more than 0.25, and/or, at a frequency of 8,000 Hz, of more than 0.1, more preferably of more than 0.25, and particularly preferably of more than 0.3. This was surprising because it was assumed that the coating with the superabsorbent particles should result in a composite material with low air permeability, and thus a low absorption coefficient.

The composite material may be present in a water-permeable bag welded at the edge. Several composite materials may also be arranged in the bag.

The composite material can be arranged in the bag in various ways. If the composite material is present in the form of absorber pads, the latter can be present stacked one on top of the other in the bag. If the composite material is present as a web product, it can be folded in the manner of a accordion and/or rolled together and flattened in the bag.

In a further embodiment, at least one composite material is present as an absorber pad. An absorber pad is understood to mean a cut composite material welded at the edges. As a result, the superabsorbent particles can be prevented from swelling outwards. A further subject matter of the present invention comprises an absorber pad which contains a composite material according to one or more of the described embodiments.

A further, preferred absorber pad is a cut composite material connected at the edges to a seam.

The absorber pad may have a wide variety of symmetrical and/or asymmetrical geometric shapes.

The absorber pad may have a composite material welded thermally at the edge and comprising a non-water-soluble distribution layer and a backing layer, wherein the non-water-soluble distribution layer and the backing layer have been thermally melted at the edge with partial penetration of the liquid-absorbing layer, thereby thermally connecting the layers to one another at the edge.

In a further embodiment, the absorber pad has two composite materials which, as described above, each have a backing layer and a liquid-absorbing layer fixed on the backing layer, wherein the liquid-absorbing layer contains fixed superabsorbent particles, and wherein a liquid-distributing layer in liquid-conducting contact with the liquid-absorbing layer is arranged on the side, facing away from the backing layer, of the liquid-absorbing layer, and absorbs and distributes, in the plane of the composite material, a liquid to be absorbed. In this embodiment, a first distribution layer assigned to a first composite material has a water-soluble distribution layer and a non-water-soluble distribution layer, and a second distribution layer assigned to a second composite material has a water-soluble distribution layer. The two composite materials are arranged such that the liquid-absorbing layers face one another. The absorber pad is, circumferentially, thermally welded at the edge, wherein at least one, non-water-soluble distribution layer has been at least partially melted—in the process, partially penetrating the liquid-absorbing layers and thereby causing a fixation of the absorber pad. In this embodiment, at least one backing layer is preferably also at least partially melted and supports the fixation of the absorber pad.

In a further embodiment, the absorber pad has two composite materials which, as described above, each have a backing layer and a liquid-absorbing layer fixed on the backing layer, wherein the liquid-absorbing layer contains fixed superabsorbent particles, and wherein a liquid-distributing layer in liquid-conducting contact with the liquid-absorbing layer is arranged on the side, facing away from the backing layer, of the liquid-absorbing layer and absorbs and distributes, in the plane of the composite material, a liquid to be absorbed. The two composite materials are arranged such that the liquid-absorbing layers face one another. The absorber pad is, circumferentially, thermally welded at the edge, wherein at least one backing layer has been at least partially melted—in the process, partially penetrating the liquid-absorbing layers and thereby causing a fixation of the absorber pad. In this embodiment, at least one, non-water-soluble distribution layer is preferably also at least partially melted and supports the fixation of the absorber pad.

In a further embodiment, the absorber pad has two composite materials which, as described above, each have a backing layer and a liquid-absorbing layer fixed on the backing layer, wherein the liquid-absorbing layer contains fixed superabsorbent particles, and wherein a liquid-distributing layer in liquid-conducting contact with the liquid-absorbing layer is arranged on the side, facing away from the backing layer, of the liquid-absorbing layer and absorbs and distributes, in the plane of the composite material, a liquid to be absorbed. In this embodiment, a first distribution layer assigned to a first composite material has a water-soluble distribution layer and a non-water-soluble distribution layer, and a second distribution layer assigned to a second composite material has a water-soluble distribution layer. The two composite materials are arranged such that the liquid-absorbing layers face one another. Arranged between these liquid-absorbing layers is a thermoplastic adhesive—preferably (co)polyester, (co)polyamide, polyurethane, and/or polyolefin—in particular, in the form of a two-dimensional sheet product, such as non-woven, film, woven fabric, and/or knitted fabric. The absorber pad is, circumferentially, thermally welded at the edge, wherein the thermoplastic adhesive has been at least partially melted—in the process, partially penetrating the liquid-absorbing layers and thereby causing a fixation of the absorber pad. In this embodiment, at least one backing layer is preferably also at least partially melted and supports the fixation of the absorber pad.

It is likewise conceivable that the absorber pad contain a composite material comprising a non-water-soluble, meltable distribution layer and a meltable backing layer. Here, the liquid-distributing layer and the backing layer project beyond the liquid-absorbing layer and are welded to one another, enclosing the liquid-absorbing layer.

In a further embodiment of the invention, the absorber pad has an absorption coefficient, measured according to EN ISO 354:2003, at a frequency of 6,300 Hz, of more than 0.09, more preferably of more than 0.2, and particularly preferably of more than 0.25, and/or, at a frequency of 8,000 Hz, of more than 0.1, more preferably of more than 0.25, and particularly preferably of more than 0.3. In this case, the absorber pad preferably has at least 2 composite materials, since particularly good acoustic properties were able to be achieved with multi-layer products in practical experiments.

In a further embodiment, the absorber pad has 2 to 8, preferably 3 to 8, and, in particular, 3 to 7 composite materials in such an arrangement that the outer layers are formed by the backing layers. The absorber pad can be welded at least partially, circumferentially, thermally at the edge. Welding enables at least partial melting of the backing layer, as a result of which the liquid-absorbing layers can be partially penetrated, and all layers can thereby be thermally connected to one another.

A further embodiment comprises an absorber pad in which at least one backing layer and at least one liquid-distributing layer and/or at least 2 backing layers are connected to one another at least partially at the edges by at least one seam.

A further embodiment comprises an absorber pad in which at least one composite material is present in a water-permeable bag, which is at least partially closed at its edges by at least one seam.

The at least one seam can be formed as a fin seam or as an overlap seam. If the bag is closed by several seams, the latter can be formed independently of one another as a fin seam or as an overlap seam.

The shape of the bag may vary. Conventional packaging designs have proven to be suitable. For example, the bag can be obtained in that two bag layers are connected to one another circumferentially by seams. As a result, 1 to 4, and preferably 4, seams are generally obtained. Alternatively, the bag can be obtained in that a bag layer is folded to form a tube and is connected at the open edges by seams. As a result, 3 seams are generally obtained.

In a preferred embodiment, the at least one seam is designed as a weld seam—in particular, a thermally-welded and/or ultrasonic-welded seam—adhesive seam, and/or needled seam. The advantage of welded seams is that they can be realized particularly quickly and easily.

The at least one seam may be continuous and/or discontinuous. Discontinuous seams are composed of direct seam areas, i.e., the regions of the seam that serve to bind the two layers and/or to close the bag, and indirect seam areas, i.e., the regions of the seam that are located between the direct seam areas. The direct seam areas are the welded regions in the case of weld seams, the regions covered by the thread in the case of sewn seams, and the regions connected by adhesive in the case of glued seams. Discontinuous seams have the advantage that they have a smaller proportion of seam area, and thus offer a higher strength per unit area.

Continuous seams have the advantage that the risk of the superabsorbent particles escaping is reduced. The at least one seam can furthermore be designed as a straight or curved line, or combinations thereof. In a discontinuous design, the at least one seam may be in the form of linear and/or regularly-arranged points and/or lines. As explained above, the portions of the seam that serve to bind the layers and/or to close the water-permeable bag are the direct seam areas of the seam. The width of the at least one seam is preferably 0.5 to 15 mm, more preferably 0.5 to 10 mm, and particularly preferably 1 to 6 mm. Further preferably, the seam area, i.e., the sum of the indirect and direct seam areas on the surface of the absorber material, is at least 0.4 to 50% by area, more preferably 2 to 40% by area, and particularly preferably 4 to 35% by area. If the seam area is under 0.4% by area, the strength of the seam is generally too low.

In a particular embodiment, the at least one seam is formed as a weld seam which is perforated—preferably in its center. This is advantageous in that the absorber material can be adapted to the installation situation in a particularly simple manner. For example, recesses can be formed deliberately by removing partial regions along the perforated weld seam.

The shape of the weld seam may vary. In a preferred embodiment, the transition between the weld seam and the non-welded regions of the layers is smooth. Consequently, in a preferred embodiment, the thickness of the welded regions of the weld seam decreases in the direction of the edge. Accordingly, the density of the welded regions of the weld seam increases in the direction of the edge. The transition between the weld seam and the bag is preferably continuous. The advantage of this is a higher strength of the weld seam.

A further subject matter of the invention is an actively- and/or passively-cooled current-carrying system comprising a composite material—preferably designed as an absorber pad—comprising a backing layer and a liquid-absorbing layer fixed on the backing layer and containing superabsorbent particles, wherein a liquid-distributing layer in liquid-conducting contact with the liquid-absorbing layer is arranged on the side, facing away from the backing layer, of the liquid-absorbing layer and absorbs and distributes, in the plane of the composite material, a liquid to be absorbed.

Figure 1:
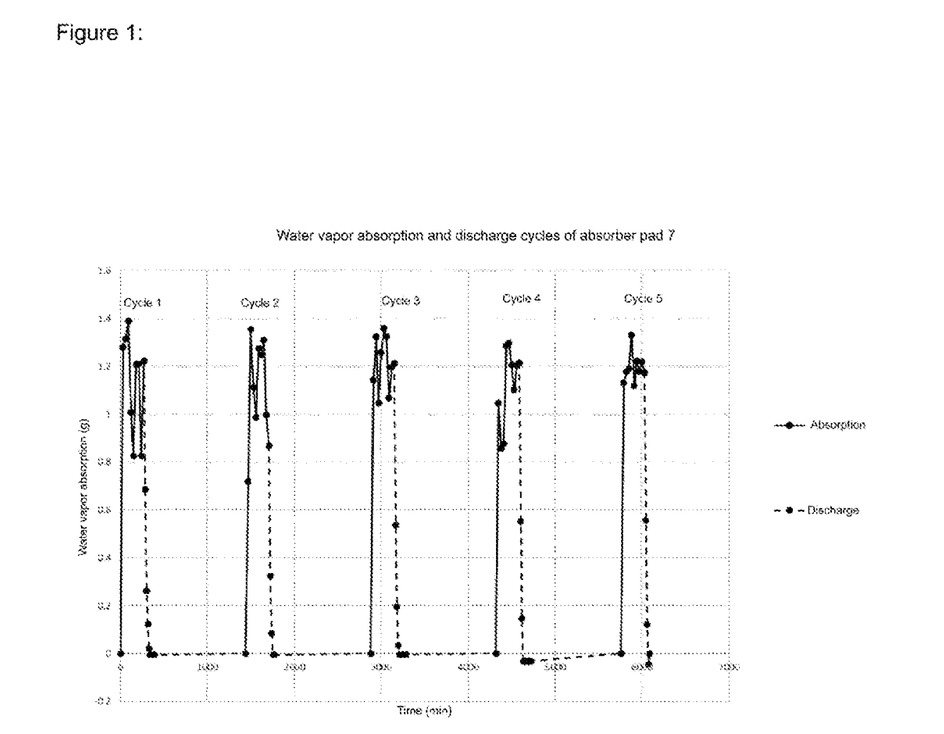
FIG. 1: Water-vapor absorption of an absorber pad according to the invention

FIG. 1 shows the water-vapor absorption of an absorber pad according to the invention. It was found that the water-vapor absorption takes place very quickly. After 30 minutes, the water-vapor absorption is already in equilibrium. In this respect, it is noteworthy that the re-drying also proceeds very quickly and is almost complete.

Figure 2:
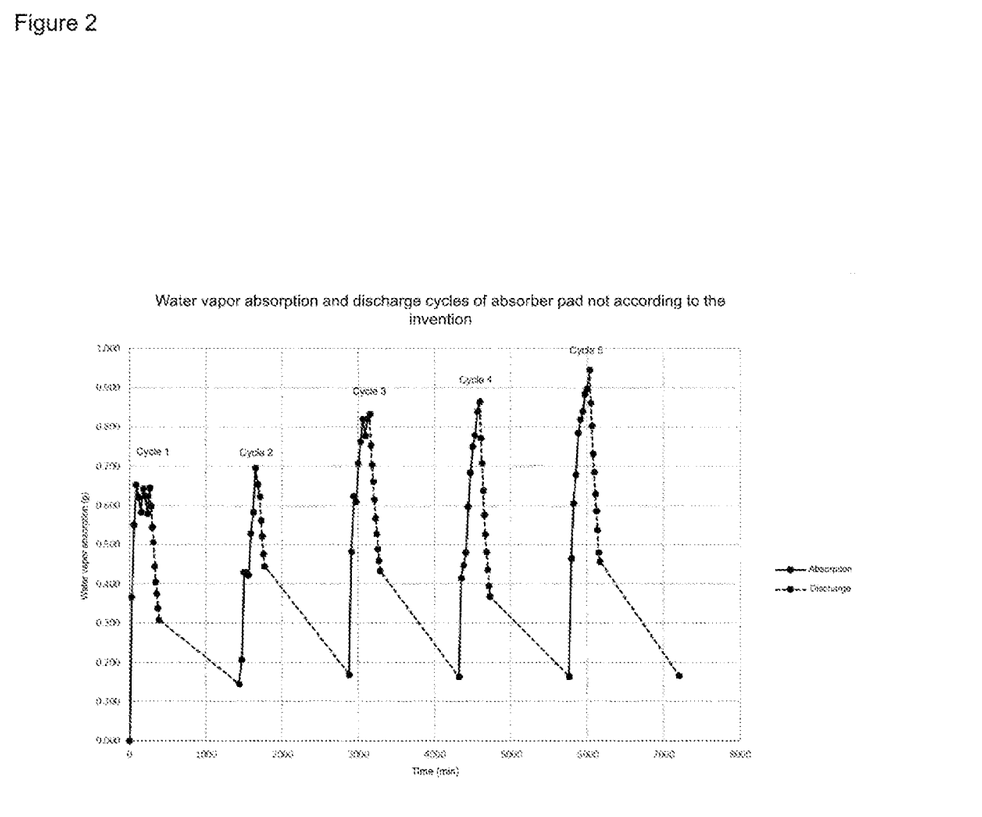
FIG. 2: Water-vapor absorption of an absorber pad not according to the invention

FIG. 2 shows the water-vapor absorption of an absorber pad not according to the invention. It was found that the water-vapor absorption takes place significantly more slowly. The water-vapor absorption is in equilibrium at the earliest after 90 minutes. In addition, the re-drying is not fully completed even after 20 h.

Figure 3:
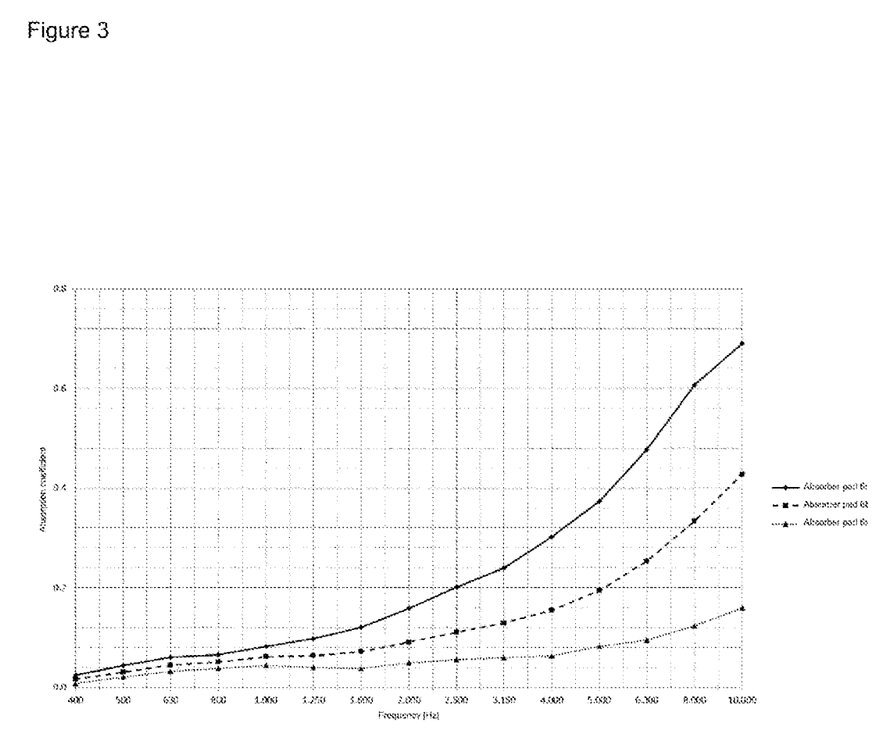
FIG. 3: Sound absorption properties of an absorber pad according to the invention

FIG. 3 shows the sound absorption properties of several absorber pads according to the invention. It was found that all absorption pads according to the invention have a good absorption coefficient.

Figure 4:
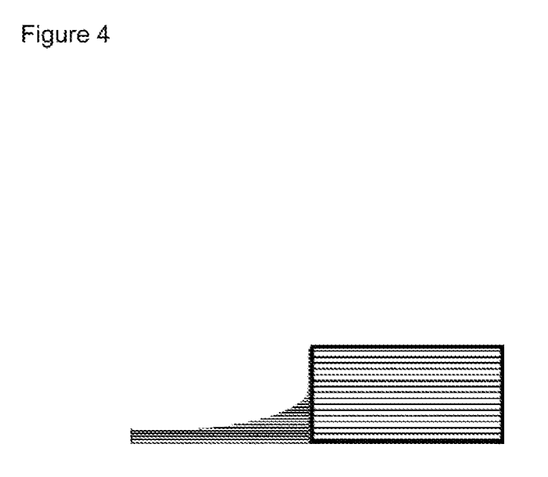
FIG. 4: Schematic representation of the cross-section of a seam 5

FIG. 4 shows the cross-section of a seam. The seam is in the form of a weld seam. The thickness of the weld seam decreases in the direction of the edge. Accordingly, the density of the weld seam increases in the direction of the edge. This transition is continuous.

The invention is explained in more detail below with reference to several examples:

Example 1

Production of Composite Materials Usable According to the Invention

Various composite materials and absorber pads usable according to the invention are produced.

The following materials were used:

Spun-bonded microfiber fabric: polyamide/polyester spun-bonded microfiber fabric "Evolon®"; 200 g/m².

Superabsorbent particles 1: partially-neutralized and crosslinked polyacrylic acid produced in the substance polymerization process with a particle-size distribution $d_{50}$ of 50 μm-1,000 μm, application weight 15 g/m².

Superabsorbent particles 2: partially-neutralized and crosslinked polyacrylic acid produced in the inverse suspension polymerization process with a particle-size distribution $d_{50}$ of 50 μm-1,000 μm, application weight 15 g/m².

Water-soluble distribution layer 1: water-soluble, partially-saponified polyvinyl alcohol with an application weight of 20 g/m²

Water-soluble distribution layer 2: water-soluble starch with an application weight of 20 g/m²

The table below shows the layer structure used

| Composite material | Liquid-distributing layer | Liquid-absorbing layer | Backing layer |
|---|---|---|---|
| 1 | water-soluble distribution layer 11 in combination with non-water-soluble distribution layer of spun-bonded microfiber fabric | Superabsorbent particles 1 fixed with PVA on backing layer | Spun-bonded microfiber fabric |
| 2 | water-soluble distribution layer 1 in combination with non-water-soluble distribution layer (thermally-bonded PES staple fiber non-woven, 40 g/m²) | Superabsorbent particles 2 fixed with PVA on backing layer | Thermally-bonded PES staple fiber non-woven, 40 g/m² |
| 3 | water-soluble distribution layer 2 in combination with non-water-soluble distribution layer (binder-bonded PES staple fiber non-woven, 40 g/m²) | Superabsorbent particles 1 fixed with PVA on backing layer | Binder-bonded PES staple fiber non-woven, 40 g/m² |
| 4 | water-soluble distribution layer 1 in combination with non-water-soluble distribution layer (thermally-bonded, spun-bonded PP non-woven, 60 g/m²) | Superabsorbent particles 2 fixed with PVA on backing layer | Thermally-bonded, spun-bonded PP non-woven, 60 g/m² |
| 5 | water-soluble distribution layer 1 | Superabsorbent particles 2 fixed with PVA on backing layer | Binder-bonded PES staple fiber non-woven, 40 g/m² |

The layers are connected as follows:

First, the carrier layer is provided and coated with the water-soluble distribution layer and the superabsorbent particles. Subsequently, the non-water-soluble distribution layer is added, if used.

The composite materials 1 through 5 are each arranged between two, thermally-weldable layers (bag layers, spun-bonded microfiber fabrics 80 g/m²), the edges of which project beyond the composite materials, and the edges of these layers are welded to an absorber pad. The step of cutting can take place before or after the welding.

In a further embodiment, several (2-5) composite materials 1-5 are welded in, and absorber pads are obtained.

In a further embodiment, the composite materials 1-5 are, circumferentially, thermally welded at the edge, wherein the non-water-soluble distribution layer and the backing layer melt and, in the process, partially penetrate the liquid-absorbing layer and thereby thermally connect all layers to one another.

In a further embodiment, 2 composite materials 5 are arranged such that the liquid-absorbing layers face one another. The composite obtained in this way is, circumferentially, thermally welded at the edge, wherein the backing layer melts, in the process partially penetrates the liquid-absorbing layers, and thereby thermally connects all layers to one another. The step of cutting can take place before or after the welding. Absorber pad 6a is obtained here.

In a further embodiment, 4 composite materials 5 are arranged such that the backing layers form the outer layers. The composite obtained in this way is, circumferentially, thermally welded at the edge, wherein the backing layers melt, in the process partially penetrate the liquid-absorbing layers, and thereby thermally connect all layers to one another. The step of cutting can take place before or after the welding. Absorber pad 6b is obtained here.

In a further embodiment, 6 composite materials 5 are arranged such that the backing layers form the outer layers. The composite obtained in this way is, circumferentially, thermally welded at the edge, wherein the backing layers melt, in the process partially penetrate the liquid-absorbing layers, and thereby thermally connect all layers to one another. The step of cutting can take place before or after the welding. Absorber pad 6c is obtained here.

In a further embodiment, 2 composite materials 5 are arranged such that the liquid-absorbing layers face one another. Between these liquid-absorbing layers, an adhesive non-woven (copolyester non-woven, 30 g/m², melting point 100-110° C.) is arranged. The composite obtained in this way is, circumferentially, thermally welded at the edge, wherein the adhesive non-woven melts and, in the process, partially penetrates the liquid-absorbing layers and thereby thermally connects all layers to one another. Absorber pad 7 is obtained here.

Example 2

Test of the Absorption Capacity of an Absorber Pad According to the Invention

The absorption capacity of absorber pad 7 according to DIN 53923 was tested with demineralized water. It was found that the absorber pad 7 has a good water absorption of 8.7 kg/m². As part of the testing according to DIN 53923, absorber pad 7 is suspended in a floating manner in the swollen state for 30 sec. Here, the water loss is 550 g/m², and thus corresponds to very good retention. The absorber pad could, moreover, be easily dried without heating, which shows that it is also able to reversibly bind water. Due to the circumferential weld, the swelling could be controlled well, and a blocking effect could be avoided by the use of distributor layers. By fixing the superabsorbent particles, dust formation could be avoided.

Example 3

Test of the Water-Vapor Absorption of an Absorber Pad According to the Invention The water-vapor absorption of absorber pad 7 was tested. For this purpose, the absorber pad was stored in a climate cabinet for a period of 270 min. at 90% humidity and 30° C. Weight increase was determined gravimetrically every 30 minutes over a period of 270 min. Subsequently, the absorber pad 7 was dried at room temperature, and the weight decrease was determined gravimetrically. This process was repeated 5 times and is shown in FIG. 1.

It was found that the water-vapor absorption takes place very quickly. After 30 minutes, the water-vapor absorption is already in equilibrium. In this respect, it is noteworthy that the re-drying also proceeds very quickly and is almost complete.

Example 4

Test of the Water-Vapor Absorption of an Absorber Pad Not According to the Invention The water-vapor absorption of an absorber pad not according to the invention was tested. The absorber pad consists of a non-woven bag which is filled with 1 g of loose, superabsorbent particles 2. Weight increase was determined gravimetrically every 30 minutes over a period of 270 min. Subsequently, the absorber pad not according to the invention was dried at room temperature for 20 h, and the weight decrease was determined gravimetrically. This process was repeated 5 times and is shown in FIG. 2. It was found that the water-vapor absorption takes place significantly more slowly. The water-vapor absorption is in equilibrium at the earliest after 90 minutes. In addition, the re-drying is not not fully completed even after 20 h.

Example 5

Test of the Sound Absorption Properties of an Absorber Pad According to the Invention The sound absorption properties of 3 different absorber pads 6a, 6b, 6c were determined according to EN ISO 354:2003. The results are shown in FIG. 3. It was found that all absorption pads according to the invention have a good absorption coefficient.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method, comprising:
providing a composite material, the composite material comprising:
a backing layer;
a liquid-absorbing layer fixed on the backing layer, the liquid-absorbing layer containing fixed superabsorbent particles, wherein the superabsorbent particles are fixed on the backing layer with a binder comprising a water-swellable binder;
a liquid-distributing layer in liquid-conducting contact with the liquid-absorbing layer is arranged on a side, facing away from the backing layer, of the liquid-absorbing layer, the liquid-distributing layer being configured to absorb and distribute, in a plane of the composite material, a liquid to be absorbed, wherein the liquid-distributing layer comprises at least two distribution layers, wherein at least one distribution layer is water-soluble and at least one other distribution layer is not water-soluble, and wherein the water-soluble distribution layer comprises same materials as the water-swellable binder; and
using the composite material to absorb and distribute liquids in actively or passively-cooled current-carrying systems, the actively or passively-cooled current-carrying systems comprising actively or passively-cooled energy storage systems.

2. The method of claim 1, wherein the actively or passively-cooled energy storage systems comprise battery systems, inverter systems, power electronics systems, or charging stations.

3. The method of claim 1, wherein the actively or passively-cooled energy storage systems comprise current-carrying systems that are actively or passively cooled with water-glycol mixtures comprising energy storage systems that are actively or passively cooled with water-glycol mixtures.

4. The method of claim 1, wherein the superabsorbent particles are fixed on the backing layer with a binder comprising a water-soluble binder or with a partially-cross-linked starch.

5. The method of claim 4, wherein the superabsorbent particles comprise a swelling retardant.

6. The method of claim 1, wherein the liquid-distributing layer comprises a non-woven, a woven fabric, a knitted fabric, or an open-pore foam.

7. The method of claim 1, wherein a surface energy of the liquid-distributing layer measured according to DIN 55660 is greater than 30 mN/m.

8. The method of claim 1, wherein the backing layer comprises thermoplastic polymers.

9. The method of claim 1, wherein the backing layer and the liquid-distributing layer are welded or weldable to one another.

10. An absorber pad, comprising:
a cut composite material that is welded at edges thereof;
a backing layer; and
a liquid-absorbing layer fixed on the backing layer, wherein the liquid-absorbing layer contains fixed superabsorbent particles, wherein the superabsorbent particles are fixed on the backing layer with a binder comprising a water-swellable binder, and wherein a liquid-distributing layer in liquid-conducting contact with the liquid-absorbing layer is arranged on a side, facing away from the backing layer, of the liquid-absorbing layer and is configured to absorb and distribute, in a plane of the composite material, a liquid to be absorbed, wherein the liquid-distributing layer comprises at least two distribution layers, wherein at least one distribution layer is water-soluble and at least one other distribution layer is not water-soluble, and wherein the water-soluble distribution layer comprises same materials as the water-swellable binder.

11. The absorber pad of claim 10, wherein the absorber pad comprises:
the composite material welded thermally at an edge;
the non-water-soluble distribution layer; and
the backing layer,
wherein the non-water-soluble distribution layer and the backing layer have been thermally melted at an edge with partial penetration of the liquid-absorbing layer, thereby thermally connecting all layers to one another at the edge.

12. The absorber pad of claim 10, wherein the absorber pad comprises two composite materials,
wherein a first distribution layer assigned to a first composite material has a water-soluble distribution layer and a non-water-soluble distribution layer, and a second distribution layer assigned to a second composite material has a water-soluble distribution layer,
wherein the two composite materials are arranged such that liquid-absorbing layers of each of the two composite materials face one another,
wherein the absorber pad is, circumferentially, thermally welded at an edge,
wherein at least one non-water-soluble distribution layer has been at least partially melted so as to partially penetrate the liquid-absorbing layers and thereby cause a fixation of the absorber pad.

13. The absorber pad of claim 10, wherein the absorber pad comprises two composite materials having water-soluble distribution layers,
wherein the two composite materials are arranged such that liquid-absorbing layers of each of the two composite materials face one another,
wherein a thermoplastic adhesive comprising a two-dimensional sheet product comprising a non-woven, film, woven fabric, or knitted fabric is arranged between the liquid-absorbing layers,
wherein the absorber pad is, circumferentially, thermally welded at an edge,
wherein the thermoplastic adhesive has been at least partially melted so as to penetrate the liquid-absorbing layers and thereby cause a fixation of the absorber pad.

14. An actively or passively-cooled current-carrying system, comprising:
a composite material;
a backing layer; and
a liquid-absorbing layer fixed on the backing layer,
wherein the liquid-absorbing layer comprises fixed superabsorbent particles, wherein the superabsorbent particles are fixed on the backing layer with a binder comprising a water-swellable binder,
wherein a liquid-distributing layer in liquid-conducting contact with the liquid-absorbing layer is arranged on a side, facing away from the backing layer, of the liquid-absorbing layer and is configured to absorb and distribute, in a plane of the composite material, a liquid to be absorbed, wherein the liquid-distributing layer comprises at least two distribution layers, wherein at least one distribution layer is water-soluble and at least one other distribution layer is not water-soluble, and wherein the water-soluble distribution layer comprises same materials as the water-swellable binder.

15. The method of claim 4, wherein the water-soluble binder comprises polyvinyl alcohol, starch, polyvinylpyrrolidone, casein glue, polyvinyl butyral, or
wherein the water-swellable binder comprises at least partially-crosslinked polyvinyl alcohol.

16. The method of claim 5, wherein the swelling retardant comprises same materials as the water-soluble or swellable binder.

17. The method of claim 7, wherein the surface energy is greater than 35 mN/m.

18. The method of claim 17, wherein the surface energy is greater than 40 mN/m.

19. The method of claim 4, wherein the water-soluble distribution layer comprises the same materials as the water-soluble binder.

* * * * *